(12) United States Patent
Tachibanada et al.

(10) Patent No.: US 9,193,346 B2
(45) Date of Patent: Nov. 24, 2015

(54) AUTOMATIC TRANSMISSION CONTROLLER

(71) Applicant: HONDA MOTOR CO., LTD., Tokyo (JP)

(72) Inventors: Yuya Tachibanada, Wako (JP); Yutaka Ishikawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 42 days.

(21) Appl. No.: 14/296,371

(22) Filed: Jun. 4, 2014

(65) Prior Publication Data

US 2014/0364276 A1     Dec. 11, 2014

(30) Foreign Application Priority Data

Jun. 11, 2013  (JP) .................................. 2013-123166

(51) Int. Cl.
  *B60W 10/06*   (2006.01)
  *B60W 10/10*   (2012.01)
  *F16H 3/66*    (2006.01)
  *B60W 10/115*  (2012.01)
  *B60W 30/18*   (2012.01)

(52) U.S. Cl.
  CPC .............. *B60W 10/10* (2013.01); *B60W 10/06* (2013.01); *B60W 10/115* (2013.01); *B60W 30/18054* (2013.01); *B60W 30/18118* (2013.01); *F16H 3/666* (2013.01); *B60W 2510/0642* (2013.01); *F16H 2200/0069* (2013.01); *F16H 2200/2012* (2013.01); *F16H 2200/2046* (2013.01); *F16H 2200/2082* (2013.01); *Y10T 477/646* (2015.01)

(58) Field of Classification Search
  CPC ................ B60W 10/06; B60W 10/10; B60W 2501/0642; B60W 30/18054
  See application file for complete search history.

(56) References Cited

U.S. PATENT DOCUMENTS

| 4,644,826 | A | * | 2/1987 | Kubo et al. | ............ | F16H 61/20 477/114 |
| 4,648,289 | A | * | 3/1987 | Kubo et al. | ............ | F16H 61/20 477/114 |
| 5,741,200 | A | * | 4/1998 | Taniguchi et al. | ...... | F16H 61/20 477/114 |
| 5,935,041 | A | * | 8/1999 | Tsukamoto et al. | .. | F16H 61/061 477/195 |

FOREIGN PATENT DOCUMENTS

| GB | 728361 a | * | 4/1955 | ............ B60W 10/06 |
| JP | 2012-046182 | | 3/2012 | |
| JP | 2012-047147 | | 3/2012 | |

\* cited by examiner

*Primary Examiner* — Tisha Lewis
(74) *Attorney, Agent, or Firm* — Mori & Ward, LLP

(57) ABSTRACT

An automatic transmission controller for controlling an automatic transmission includes an idling reduction controller, an idling-reduction-control permission determiner, and an engagement controller. The idling-reduction-control permission determiner is configured to determine whether or not to permit an idling reduction control. The engagement controller, in a case where the idling-reduction-control permission determiner permits the idling reduction control, is configured to allow rotation of an input shaft of an automatic transmission, and in a case where an output shaft of the automatic transmission is rotated by a wheel of a vehicle in a rotational direction such that the vehicle moves backward, is configured to set a plurality of engagement mechanisms including at least a mechanical engagement mechanism so as to fix the output shaft of the automatic transmission to a casing of the automatic transmission or so as to prevent the vehicle from moving backward.

24 Claims, 11 Drawing Sheets

FIG. 2A

| PGS1 | 2.681 |
|---|---|
| PGS2 | 1.914 |
| PGS3 | 1.614 |
| PGS4 | 2.734 |

FIG. 2B

|  | RATIO | STEP |  |
|---|---|---|---|
| R1 | 4.008 |  | 76.6% |
| 1st | 5.233 | 1-2 | 1.554 |
| 2nd | 3.367 | 2-3 | 1.465 |
| 3rd | 2.298 | 3-4 | 1.348 |
| 4th | 1.705 | 4-5 | 1.251 |
| 5th | 1.363 | 5-6 | 1.363 |
| 6th | 1.000 | 6-7 | 1.273 |
| 7th | 0.786 | 7-8 | 1.196 |
| 8th | 0.657 | 8-9 | 1.126 |
| 9th | 0.584 | 9-10 | 1.12 |
| 10th | 0.520 | SPREAD | 10.061 |

FIG. 3

|      | F1 | B1 | B2 | C1 | C3 | C2 | B3 |
|------|----|----|----|----|----|----|----|
| RVS1 | ○  |    | ○  |    | ○  |    |    |
| 1st  | ○  | ○  | ○  |    |    |    |    |
| 2nd  |    | ○  | ○  |    |    | ○  |    |
| 3rd  |    | ○  | ○  |    | ○  |    |    |
| 4th  |    | ○  |    |    | ○  | ○  |    |
| 5th  |    | ○  |    | ○  | ○  |    |    |
| 6th  |    |    |    | ○  | ○  | ○  |    |
| 7th  |    |    | ○  | ○  | ○  |    |    |
| 8th  |    |    | ○  | ○  |    | ○  |    |
| 9th  |    |    | ○  | ○  |    |    | ○  |
| 10th |    |    |    | ○  |    | ○  | ○  |

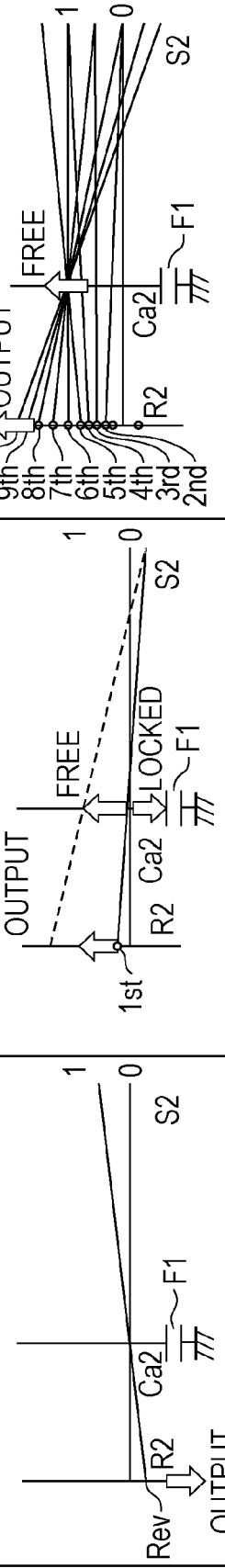

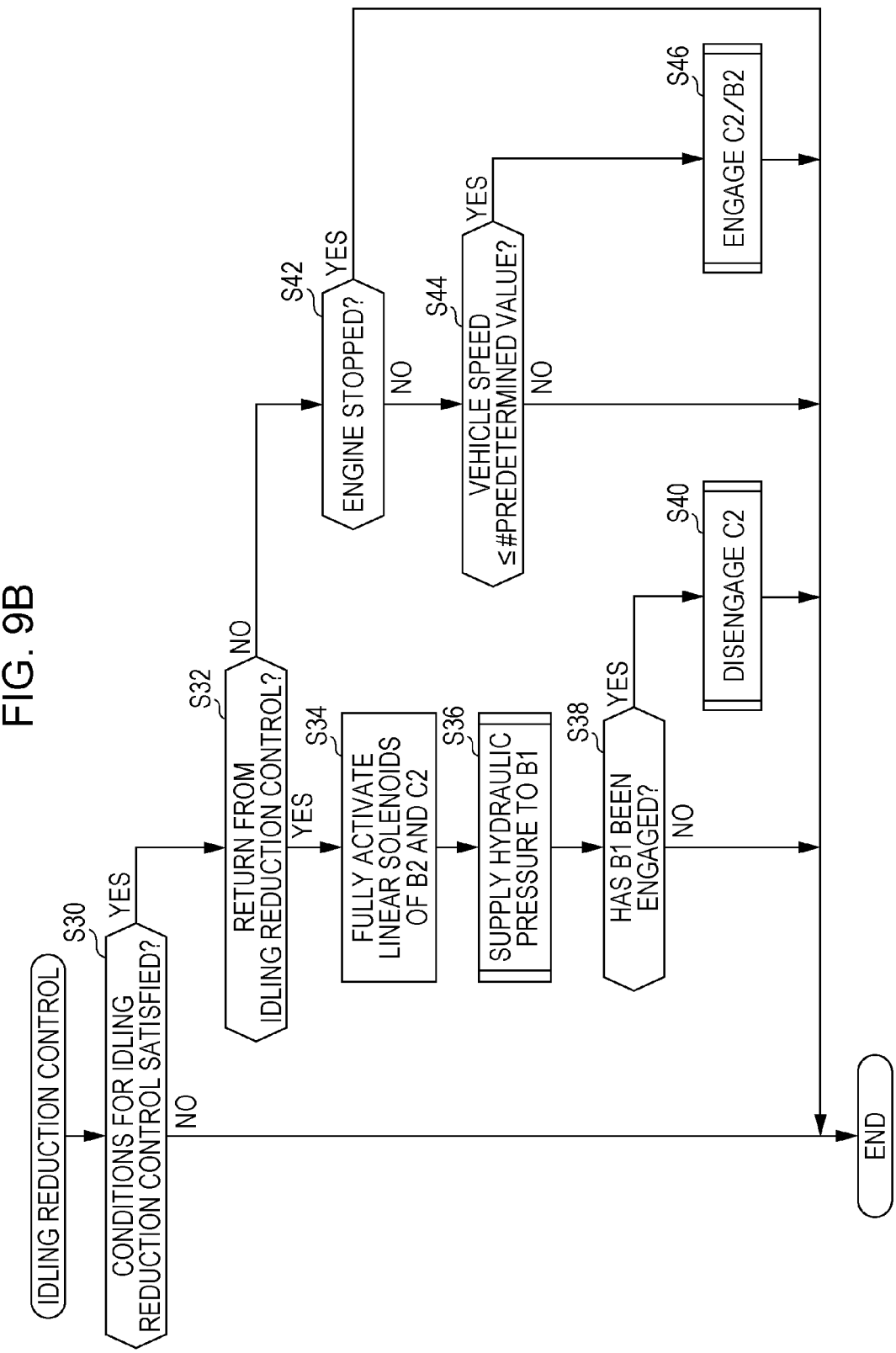

AUTOMATIC TRANSMISSION CONTROLLER

CROSS-REFERENCE TO RELATED APPLICATIONS

The present application claims priority under 35 U.S.C. §119 to Japanese Patent Application No. 2013-123166, filed Jun. 11, 2013, entitled "Automatic Transmission Controller." The contents of this application are incorporated herein by reference in their entirety.

BACKGROUND

1. Field

The present disclosure relates to an automatic transmission controller.

2. Description of the Related Art

To improve driving performance and drivability, the number of gear ratios of an automatic transmission for an automobile is being increased. In general, an automatic transmission includes engagement mechanisms, such as planetary gear mechanisms, clutches, and brakes. The gear ratio of the automatic transmission is changed by changing the power transmission path by using the engagement mechanisms. Such an automatic transmission includes a torque converter (starting mechanism) that is disposed between a drive source and a driving wheel of a vehicle and that transmits rotational power from the drive source to the driving wheel.

In recent years, automatic transmission controllers that perform so-called "idling reduction control" when a vehicle stops have been increasingly used.

When a vehicle that performs idling reduction control stops on, for example, an uphill slope, backward movement of the vehicle can be prevented by using a creep torque of the torque converter if the starting response of the engine is sufficiently good. However, if the inclination angle of the slope is considerably large, it is not possible to prevent backward movement. Moreover, the driver may be unexpectedly inconvenienced because the engine stops when idling reduction control is performed.

For example, Japanese Unexamined Patent Application Publication No. 2012-46182 describes a controller that detects the inclination angle of a position at which a vehicle stops. The controller increases a braking force when the vehicle stops on a slope with consideration that stopping the engine leads to a decrease in the braking force.

Japanese Unexamined Patent Application Publication No. 2012-47147 describes a controller that uses a sensor for detecting the inclination angle of a slope so that a vehicle does not move down the slope when idling reduction control is performed.

SUMMARY

According to one aspect of the present invention, an automatic transmission controller for controlling an automatic transmission includes an idling reduction controller, an idling-reduction-control permission determiner, and an engagement controller. The automatic transmission transmits a driving force from an internal combustion engine to a wheel of a vehicle while shifting the driving force by selecting a gear ratio from a plurality of gear ratios in accordance with a driving state of the vehicle. The automatic transmission includes a starting mechanism, a plurality of planetary gear mechanisms, and a plurality of engagement mechanisms. The starting mechanism is connected to the internal combustion engine. The plurality of planetary gear mechanisms each include rotation elements that are a sun gear, a carrier, and a ring gear. The plurality of engagement mechanisms connect or hold fixed the rotation elements of the planetary gear mechanisms and set the plurality of gear ratios of the automatic transmission by means of a combination of engagements between the plurality of engagement mechanisms and the rotation elements. One of the plurality of engagement mechanisms is a mechanical engagement mechanism that permits switching of a rotational direction of one of the rotation elements of the plurality of planetary gear mechanisms. The idling reduction controller performs idling reduction control in which the mechanical engagement mechanism is operated to switch rotational directions for a forward gear and a reverse gear and to allow rotation in each of the forward gear and the reverse gear and in which the internal combustion engine is stopped. The idling-reduction-control permission determiner determines whether or not to permit the idling reduction control. The engagement controller, when the idling-reduction-control permission determiner permits the idling reduction control, allows rotation of an input shaft of the automatic transmission, and in a case where an output shaft of the automatic transmission is rotated by a wheel of the vehicle in a rotational direction such that the vehicle moves backward, sets the plurality of engagement mechanisms including at least the mechanical engagement mechanism so as to fix the output shaft of the automatic transmission to a casing of the automatic transmission or so as to prevent the vehicle from moving backward.

According to another aspect of the present invention, an automatic transmission controller for controlling an automatic transmission includes an idling reduction controller, a vehicle velocity detector, and an engagement controller. The automatic transmission transmits a driving force from an internal combustion engine to a wheel of a vehicle while shifting the driving force by selecting a gear ratio from a plurality of gear ratios in accordance with a driving state of the vehicle. The automatic transmission includes a starting mechanism, a plurality of planetary gear mechanisms, a plurality of engagement mechanisms, and a first hydraulic pump. The starting mechanism is connected to the internal combustion engine. The plurality of planetary gear mechanisms each include rotation elements that are a sun gear, a carrier, and a ring gear. The plurality of engagement mechanisms connect or hold fixed the rotation elements of the planetary gear mechanisms and set the plurality of gear ratios of the automatic transmission by means of a combination of engagements between the plurality of engagement mechanisms and the rotation elements. One of the plurality of engagement mechanisms is a mechanical engagement mechanism that permits switching of a rotational direction of one of the rotation elements of the plurality of planetary gear mechanisms. The other engagement mechanisms are frictional engagement mechanisms that are operated by using a hydraulic pressure. The first hydraulic pump generates a hydraulic pressure when the internal combustion engine is driven. The idling reduction controller performs idling reduction control in which the mechanical engagement mechanism is operated to switch rotational directions for a forward gear and a reverse gear and to allow rotation in each of the forward gear and the reverse gear and in which the internal combustion engine is stopped. The vehicle velocity detector detects a velocity of the vehicle. The engagement controller, when the detected velocity of the vehicle is less than or equal to a predetermined value, allows rotation of an input shaft of the automatic transmission, and in a case where an output shaft of the automatic transmission is rotated by a wheel of the vehicle in a rotational direction such that the vehicle moves backward, sets the plurality of engagement mechanisms including at least the mechanical engagement mechanism so as to fix the output shaft of the automatic transmission to a casing of the automatic transmission.

According to further aspect of the present invention, an automatic transmission controller for controlling an automatic transmission includes an idling reduction controller, an idling-reduction-control permission determiner, and an engagement controller. The automatic transmission transmits a driving force from an internal combustion engine to a wheel of a vehicle while shifting the driving force by selecting a gear ratio from a plurality of gear ratios in accordance with a driving state of the vehicle. The automatic transmission includes a starting mechanism, a plurality of planetary gear mechanisms, and a plurality of engagement mechanisms. The starting mechanism is connected to the internal combustion engine. The plurality of planetary gear mechanisms each include rotation elements including a sun gear, a carrier, and a ring gear. The plurality of engagement mechanisms connect or hold fixed the rotation elements of the planetary gear mechanisms and set the plurality of gear ratios of the automatic transmission by means of a combination of engagements between the plurality of engagement mechanisms and the rotation elements. One of the plurality of engagement mechanisms is a mechanical engagement mechanism that permits switching of a rotational direction of one of the rotation elements of the plurality of planetary gear mechanisms. The idling reduction controller is configured to perform idling reduction control in which the mechanical engagement mechanism is operated to switch rotational directions for a forward gear and a reverse gear and to allow rotation in each of the forward gear and the reverse gear and in which the internal combustion engine is stopped. The idling-reduction-control permission determiner is configured to determine whether or not to permit the idling reduction control. The engagement controller, in a case where the idling-reduction-control permission determiner permits the idling reduction control, is configured to allow rotation of an input shaft of the automatic transmission, and in a case where an output shaft of the automatic transmission is rotated by a wheel of the vehicle in a rotational direction such that the vehicle moves backward, is configured to set the plurality of engagement mechanisms including at least the mechanical engagement mechanism so as to fix the output shaft of the automatic transmission to a casing of the automatic transmission or so as to prevent the vehicle from moving backward.

According to the other aspect of the present invention, an automatic transmission controller for controlling an automatic transmission includes an idling reduction controller, a vehicle velocity detector, and an engagement controller. The automatic transmission transmits a driving force from an internal combustion engine to a wheel of a vehicle while shifting the driving force by selecting a gear ratio from a plurality of gear ratios in accordance with a driving state of the vehicle. The automatic transmission includes a starting mechanism, a plurality of planetary gear mechanisms, a plurality of engagement mechanisms, and a first hydraulic pump. The starting mechanism is connected to the internal combustion engine. The plurality of planetary gear mechanisms each include rotation elements including a sun gear, a carrier, and a ring gear. The plurality of engagement mechanisms connect or hold fixed the rotation elements of the planetary gear mechanisms and set the plurality of gear ratios of the automatic transmission by means of a combination of engagements between the plurality of engagement mechanisms and the rotation elements. One of the plurality of engagement mechanisms is a mechanical engagement mechanism that permits switching of a rotational direction of one of the rotation elements of the plurality of planetary gear mechanisms. Other engagement mechanisms are frictional engagement mechanisms that are operated by using a hydraulic pressure. The first hydraulic pump generates a hydraulic pressure when the internal combustion engine is driven. The idling reduction controller is configured to perform idling reduction control in which the mechanical engagement mechanism is operated to switch rotational directions for a forward gear and a reverse gear and to allow rotation in each of the forward gear and the reverse gear and in which the internal combustion engine is stopped. The vehicle velocity detector is configured to detect a velocity of the vehicle. The engagement controller, in a case where the detected velocity of the vehicle is less than or equal to a predetermined value, is configured to allow rotation of an input shaft of the automatic transmission, and in a case where an output shaft of the automatic transmission is rotated by a wheel of the vehicle in a rotational direction such that the vehicle moves backward, is configured to set the plurality of engagement mechanisms including at least the mechanical engagement mechanism so as to fix the output shaft of the automatic transmission to a casing of the automatic transmission.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 2A is a table showing the gear ratios of four planetary gear mechanisms of the automatic transmission shown in FIG. 1A.

FIG. 2B is a table showing the final gear ratios, including ten forward gears and one reverse gear, obtained by using the four planetary gear mechanisms having the gear ratios shown in FIG. 2A in the automatic transmission shown in FIG. 1A.

FIG. 3 is a table showing a pattern of combination of engagement or disengagement of three clutches and three brakes with which gear ratios shown in FIG. 2B are obtained by using the automatic transmission shown in FIG. 1A.

FIG. 7A illustrates a TWC in a state in which it is locked in both rotational directions.

FIG. 7B illustrates the TWC in a state in which it is locked in a counterclockwise direction.

FIG. 7C illustrates the TWC in a state in which it is free in both rotational directions.

FIG. 9B is a flowchart illustrating a process of controlling the automatic transmission according to a second embodiment that does not include an electric pump, the process being performed when stopping idling reduction control.

DESCRIPTION OF THE EMBODIMENTS

Figure 1A:
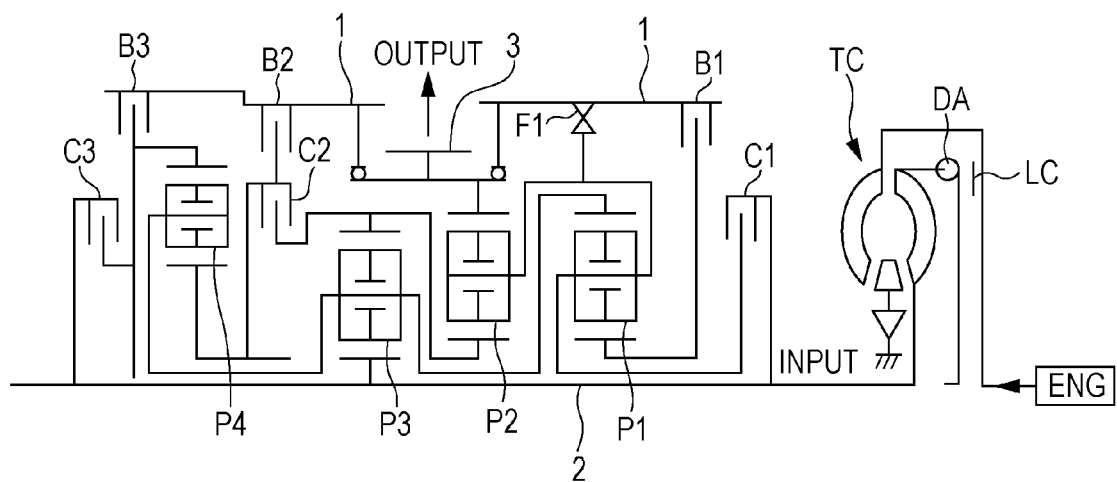
FIG. 1A is a skeleton diagram of an automatic transmission according to an embodiment of the present disclosure.

The embodiments will now be described with reference to the accompanying drawings, wherein like reference numerals designate corresponding or identical elements throughout the various drawings.

Structure of Engagement Mechanism of Automatic Transmission

FIG. 1A illustrates an automatic transmission according to an embodiment of the present disclosure, which has ten forward gears and one reverse gear. The automatic transmission includes a casing 1, an input shaft 2, and an output member 3. The input shaft 2 is rotatably supported in the casing 1. A driving force that is output from a drive source ENG, such as an internal combustion engine or the like, is transmitted to the input shaft 2 through a torque converter TC that includes a lock-up clutch LC and a damper DA. The output member 3 includes an output gear that is disposed coaxially with the input shaft 2. Rotation of the output member 3 is transmitted to left and right driving wheels of a vehicle through a differential gear (not shown) and a propeller shaft (not shown. Instead of the torque converter TC, a single-disc or multi-disc starting clutch, which is configured to be frictionally engageable, may be used.

First to fourth planetary gear mechanisms P1 to P4 are disposed in the casing 1 so as to be coaxial with the input shaft 2.

Figure 1B:
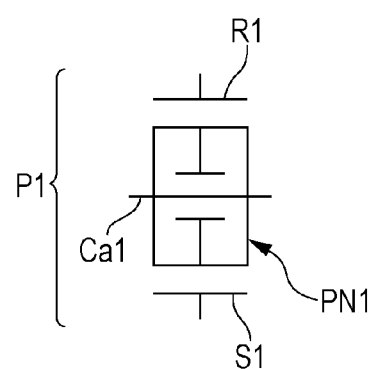
FIG. 1B is a block diagram of a representative one of planetary gear mechanisms of the automatic transmission shown in FIG. 1A.

Each of the four planetary gear mechanisms P1 to P4 is a so-called single-pinion planetary gear mechanism. For example, the planetary gear mechanism P1 includes, as shown in FIG. 1B from below, a sun gear S1, a pinion PN1, a carrier Ca1 that rotatably and revolvably supports the pinion PN1, and a ring gear R1 that meshes with the sun gear S1 and the pinion PN1. (This planetary mechanism is also called a minus planetary gear mechanism or a negative planetary gear mechanism because the sun gear and the ring gear rotate in opposite directions when the carrier is held fixed. When the ring gear is held fixed, the sun gear and the carrier rotate in the same direction.)

In addition to the four single-pinion planetary gear mechanisms P1 to P4, the automatic transmission according to the embodiment includes clutches C1 to C3 and brakes B1 to B3 so that the automatic transmission can have forward ten gears. Each of the clutches C1 to C3 disengageably connects one rotational element to another. One side of each of the brakes B1 to B3 is connected to the casing so that the brakes B1 to B3 can reduce a rotational driving force. The clutches C1 to C3 and the brakes B1 to B3 are examples of "engagement mechanisms" of the present disclosure.

Each of the clutches C1 to C3 and the brakes B1 to B3 includes a so-called wet clutch disc or a brake disc that are hydraulically driven.

In the present specification and the drawings, a symbol "Ca" is used to denote a "carrier" in a planetary gear mechanism. A symbol "C" is used to denote a so-called "clutch", which is not included in a planetary gear mechanism and disengageably transmits a rotational driving force from one rotational element to another.

The automatic transmission according to the embodiment illustrated in FIG. 1A includes a two-way clutch (TWC) F1. The TWC F1 can selectively function as a brake or a clutch, and one end of the TWC F1 is fixed to the casing 1.

As illustrated in FIG. 1A, the automatic transmission according to the present embodiment includes the four planetary gear mechanisms (P1 (or "PGS1") to P4 (or "PGS4")) and the seven engagement mechanisms described above (the three clutches C1 to C3, the TWC F1 as a mechanical engagement mechanism, and the three brakes B1 to B3), which are connected to each other as shown in FIG. 1A. By changing the combination of ON/OFF states of these mechanisms as shown in FIG. 3, the automatic transmission can realize one reverse gear (R1) and ten forward gears (first to tenth gears) shown in FIG. 2B.

The present disclosure provides an automobile transmission controller that can prevent unintentional backward movement (that is, reverse rotation of driving wheels) of a vehicle when control of the vehicle is changed from idling reduction control to normal control. In view of this, the values of gear ratios of the planetary gear mechanisms shown in FIG. 2A, the number of gear ratios shown in FIG. 2B, and the values of gear ratios shown in FIG. 2B are not essential for the present disclosure. In other words, the present disclosure is applicable to any transmission having planetary gear mechanisms of any structures, any number of gear ratios, and any gear ratios.

For the same reason, the present disclosure is not limited to eleven gear ratios obtained by means of combinations of engagements of seven engagement mechanisms and four planetary gear mechanisms shown in FIG. 3.

Two-Way Clutch (TWC)

In the automatic transmission shown in FIG. 1A, the clutches C1 to C3 are called "clutches" and the brakes B1 to B3 are "brakes" due to the difference in their uses. However, they all have clutch mechanisms. A "clutch" transmits or does not transmit rotational motion input thereto by being engaged or disengaged. A "brake", one side of which is fixed to the casing 1 of the automatic transmission or the like, decelerates or does not decelerate rotational motion input thereto by being engaged or disengaged.

The TWC (F1) according to the embodiment provides three states relating to input rotations in forward and reverse directions, which are opposite each other, and output rotations in forward and reverse directions, which are opposite each other:

(i) the TWC locks forward rotation and reverse rotation;
(ii) the TWC locks forward rotation (or reverse rotation), but allows reverse rotation (or forward rotation) to be free; and
(iii) the TWC allows forward rotation and reverse rotation to be free.

Based on such function of the TWC (or F1), the TWC is a "mechanical engagement mechanism", whereas the clutch and the brake are "engagement mechanisms". To be specific, the TWC is an "engagement mechanism that can change the rotational direction of a rotation element of a planetary gear mechanism".

Figure 4A:
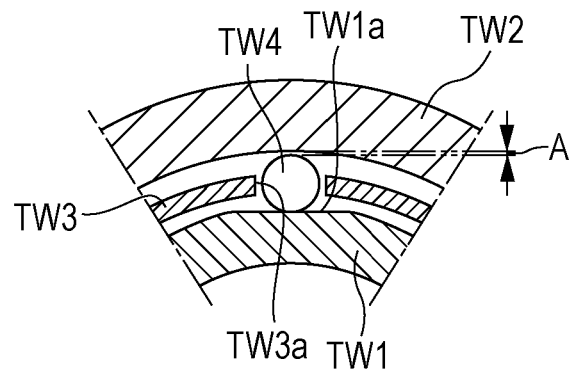
FIG. 4A illustrates a two-way clutch (TWC) used in the automatic transmission according to the embodiment in an initial state (in which the clutch is freely rotatable in two directions).
Figure 4B:
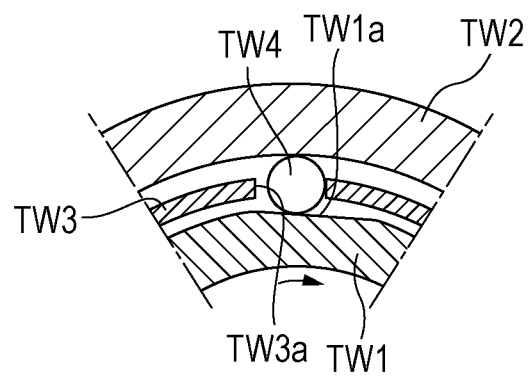
FIG. 4B illustrates the TWC in a state in which the clutch is freely rotatable in one direction.

Referring to FIGS. 4A and 4B, the two-way clutch F1, which is a "mechanical engagement mechanism" according to the present embodiment, will be described.

As illustrated in FIGS. 4A and 4B, the engagement mechanism F1 according to the present embodiment, which is a two-way clutch (TWC), includes an inner ring TW1, an outer ring TW2, and a retention ring TW3. The inner ring TW1 is connected to a rotational body in which the carrier Ca1 of the planetary gear mechanism P1 and the carrier Ca2 of the planetary gear mechanism P2 (in the embodiment shown in FIG. 1A) are coupled to each other. The outer ring TW2 is disposed outward from the inner ring TW1 in the radial direction with a predetermined distance therebetween and is connected to the casing 1. The retention ring TW3 is disposed between the inner ring TW1 and the outer ring TW2.

The three rings TW1 to TW3 have substantially cylindrical shapes extending along the rotation axis thereof. On the outer peripheral surface of the inner ring TW1 (in other words, a surface closer to the retention ring TW3), a plurality of cam faces TW1a are formed along the outer peripheral surface with equal distances therebetween. The cam faces TW1a may be planar or concave. A plurality of cutout holes TW3a are formed in the retention ring TW3 so as to correspond to the plurality of cam faces TW1a of the inner ring TW1. Rollers TW4 are disposed in the cutout holes TW3a. The diameter of each of the cutout holes TW3a formed in the retention ring TW3 is slightly greater than the diameter of each of the rollers TW4.

Cam faces are not formed on the inner peripheral surface of the outer ring TW2, in contrast to the outer peripheral surface of the inner ring TW1, on which the cam faces TW1a are formed. The distance between the inner peripheral surface of the outer ring TW2 and the outer peripheral surface of the inner ring TW1 is less than the diameter of the roller TW4. However, the distance between each of the cam faces TW1a of the inner ring TW1 and the inner peripheral surface of the outer ring TW2 measured at the center position of the cam face TW1a in the rotational direction of the ring (which is substantially the largest at the center position) is greater than the diameter of the roller TW4 (by a distance A in the example shown in FIG. 4A).

Therefore, as illustrated in FIG. 4A, in a state in which the inner ring TW1 is disposed at the innermost position, the retention ring TW3 is disposed at the middle position, the outer ring TW2 is disposed at the outermost position, and each of the rollers TW4 is disposed in a corresponding one of the cutout holes TW3a of the retention ring TW3, the rollers TW4 are rotatable in the cutout holes TW3a and between the inner peripheral surface of the outer ring and the cam faces of the inner ring.

The two-way clutch TWC shown in FIGS. 4A and 4B (F1 (TWC) in FIG. 1A) includes first and second electromagnetic clutches 30 and 31 described below (see FIG. 5). The first electromagnetic clutch 30 connects the outer ring TW2 to the retention ring TW3 when electric current is applied thereto. When electric current is not applied to the first electromagnetic clutch 30, the retention ring TW3 can rotate freely relative to the inner ring TW1 and the outer ring TW2.

Figure 5:
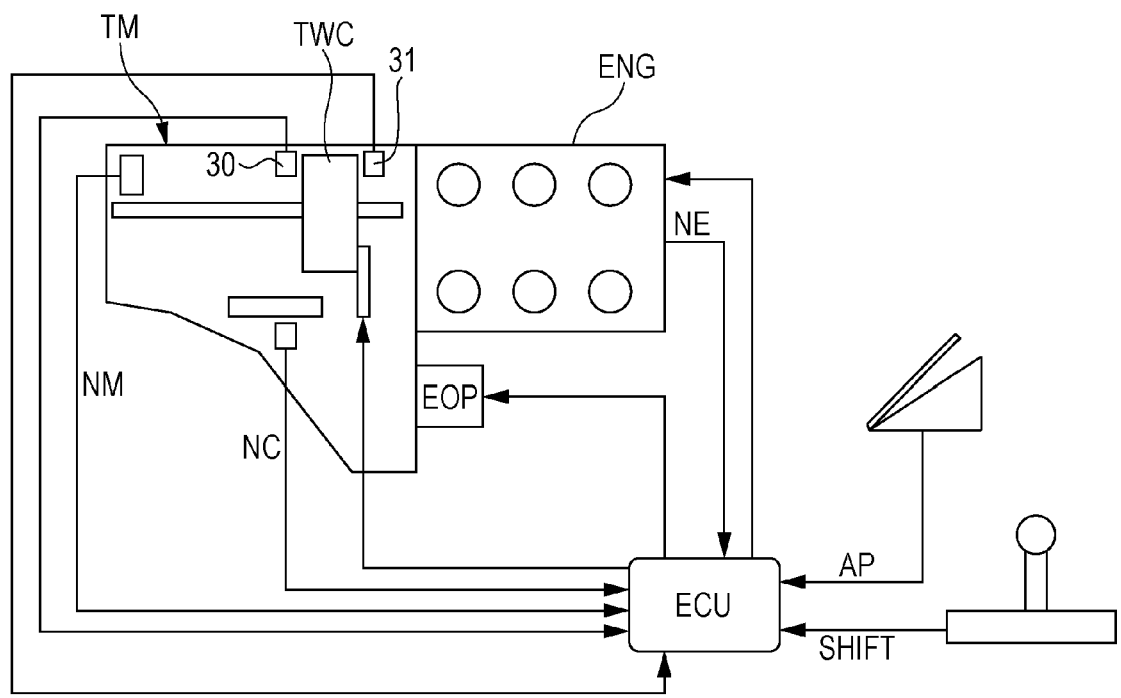
FIG. 5 illustrates signals that are exchanged between an automatic transmission controller (ECU) and the automatic transmission according to the embodiment.

The TWC shown in FIGS. 4A and 4B, that is, the clutch F1 shown in FIG. 1A controls engagement of the outer ring and the inner ring by performing ON/OFF control of application of electric current to the first electromagnetic clutch 30 (shown in FIG. 5). As described above, the outer ring TW2 is fixed to the casing 1, and the inner ring TW1 is coupled to the rotational body in which the carrier Ca1 of the planetary gear mechanism P1 and the carrier Ca2 of the planetary gear mechanism P2 are coupled to each other. Therefore, when electric current is applied to the first electromagnetic clutch 30, the outer ring TW2 and the inner ring TW1 become coupled to each other. As a result, the carriers of the planetary gear mechanism P1 and the planetary gear mechanism P2 become locked.

When electric current is not applied to the first electromagnetic clutch 30, the inner ring TW1 is free. Therefore, the states of the planetary gear mechanisms P1 and P2 depend on the engagement/disengagement of the clutches C1 to C3 and the brakes B1 to B3.

When electric current is applied to the first electromagnetic clutch, the retention ring TW3 is fixed to the casing 1 through the outer ring TW2. In this case, as illustrated in FIG. 4B, the outer ring TW2 is locked by the casing and the retention ring TW3 is fixed to the inner ring TW1. Therefore, when the inner ring TW1 attempts to rotate in any of the forward rotation and the reverse rotation, the roller TW4, which is substantially integrated with the retention ring TW3, is located at the downstream end of the cam face TW1a in the rotational direction of the inner ring TW1 and the retention ring TW3.

FIG. 4B illustrates a state in which the roller TW4 is in contact with the right end of the cutout hole TW3a as the inner ring TW1 and the retention ring TW3 integrally rotate in the counterclockwise direction. At this time, the roller TW4 is held between the cam face TW1a and the inner peripheral surface of the outer ring TW2, and rotation of the inner ring TW1 is inhibited by the outer ring TW2, which is coupled to the casing. In other words, the two-way clutch TWC is locked.

An operation of the second electromagnetic clutch 31 (shown in FIG. 5) will be described.

The state of the second electromagnetic clutch is switchable between a first state, a second state, and an open state. In the first state, as illustrated in FIG. 4B, the retention ring TW3 is connected to the inner ring TW1 in a state in which the cutout hole TW3a is located at the right end of the cam face TW1a. In the second state, the retention ring TW3 is connected to the inner ring TW1 in a state in which the cutout hole TW3a is located at the other end of the cam face TW1a. In the open state, the retention ring TW3 is disconnected from the inner ring TW1.

The clockwise direction in FIGS. 4A and 4B is defined as the reverse rotational direction. The two-way clutch TWC disconnects the outer ring TW2 from the retention ring TW3 by stop supplying (turning off) electric current to the first electromagnetic clutch and enters a reverse-rotation inhibiting state by causing the second electromagnetic clutch to be in the first state.

In other words, one end of the TWC is fixed to the casing; and the carrier Ca1 of the planetary gear mechanism P1 and the carrier Ca2 of the planetary gear mechanism P2 are coaxially connected to the input shaft of the TWC. Therefore, with a first electromagnetic clutch signal and a second electromagnetic clutch signal, rotation of each of the carrier Ca1 and the carrier Ca2 can be in the following four states:
(i) the rotation is locked in forward direction and reverse direction;
(ii) the rotation is locked in forward direction, but is free in reverse direction;
(iii) the rotation is free in forward direction, but is locked in reverse direction; and
(iv) the rotation is free in forward direction and reverse direction. However, because the TWC (F1) is used together with the planetary gear mechanism P2, it is sufficient that the TWC (F1) can control the rotation to be in the following three states as illustrated in FIGS. 7A to 7C:
(i) the rotation is locked in forward direction and reverse direction;
(ii) the rotation is free in forward direction, but is locked in reverse direction; and
(iii) the rotation is free in forward direction and reverse direction.

Control Process

FIG. 5 illustrates the structure of the automatic transmission controller shown in FIG. 1A. An accelerator pedal signal AP, a shift-position signal SHIFT, a main shaft rotational speed NM, and an engine rotational speed NE are input to the electronic control unit (ECU). The ECU outputs signals to the first electromagnetic clutch 30 and the like. In the present embodiment, idling reduction control is performed. When the engine stops, the engine cannot drive a pump, and it is necessary to use an electric pump. Therefore, the present embodiment includes an electric pump (EOP), which supplies hydraulic pressures to the clutches C1 to C3 and the brakes B1 to B3 when idling reduction control is performed and the engine stops.

Although it is not shown in FIG. 5, a pair of engageable members of each of the clutches C1 to C3, the brakes B1 to B3, and the TWC (F1) have a hydraulic pressure chamber. When the ECU sends a driving signal to energize a solenoid, a pump (not shown) supplies a fluid to the hydraulic chamber to operate each of the clutches and the brakes.

In the present embodiment, it is necessary to detect a fluid pressure applied to each of the clutches and the brakes in a control process described below. The fluid pressure can be detected by using a hydraulic pressure sensor. However, in the present embodiment, the hydraulic pressure is indirectly detected by using a time for which the oil pump is operated (the temperature of oil) and a time for which electric current is applied to a solenoid that serves to supply oil to the clutch or the brake. As a result, it is not necessary to use a hydraulic pressure sensor.

Figure 6:
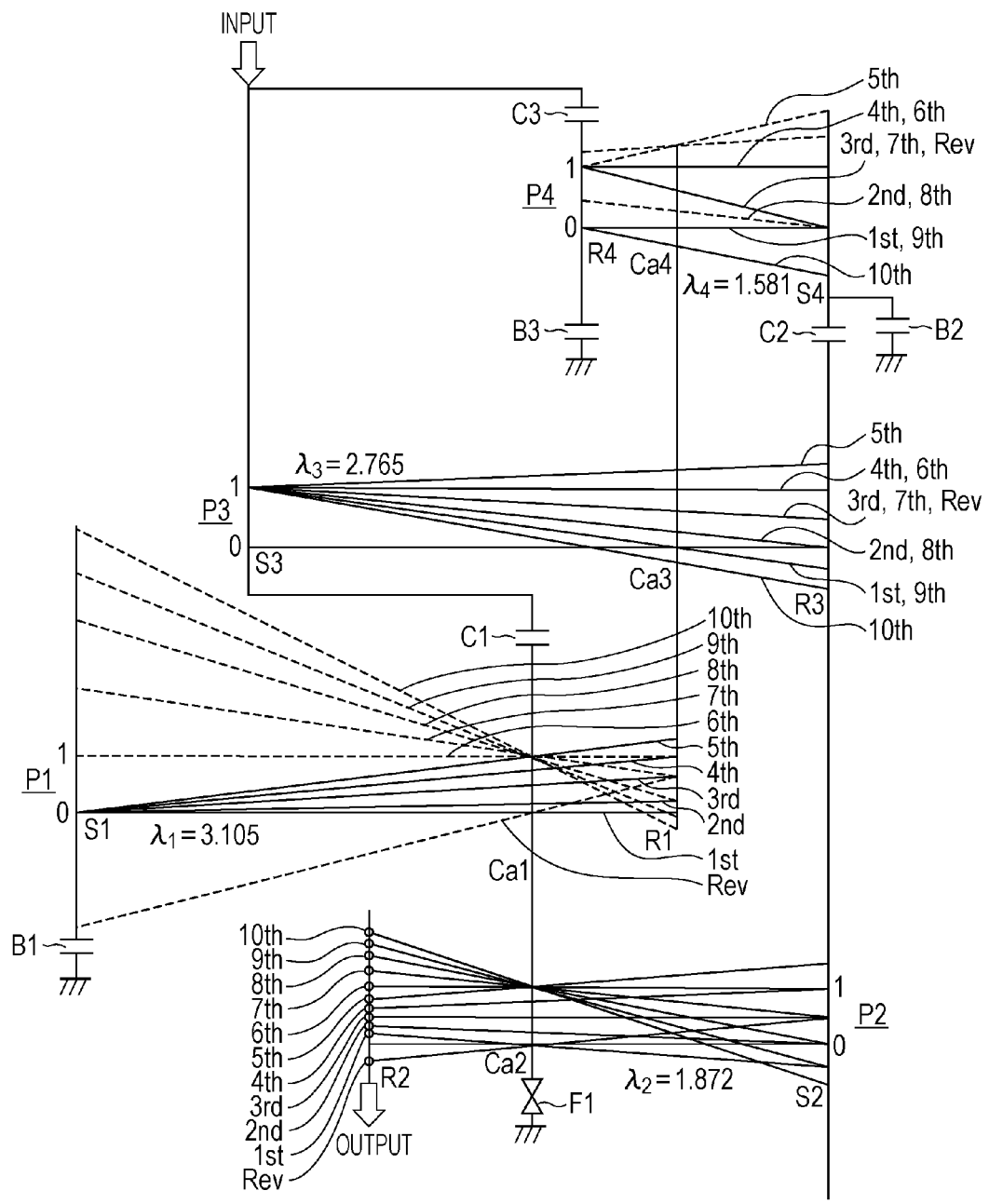
FIG. 6 is a velocity diagram of the four planetary gear mechanisms of the automatic transmission shown in FIG. 1A.

FIG. 6 is a velocity diagram of the automatic transmission shown in FIG. 1A. FIGS. 7A to 7C illustrate how the axle is locked when the automatic transmission is shifted up to first gear (or second gear) from an idling reduction control state to start the vehicle.

Figure 8A:
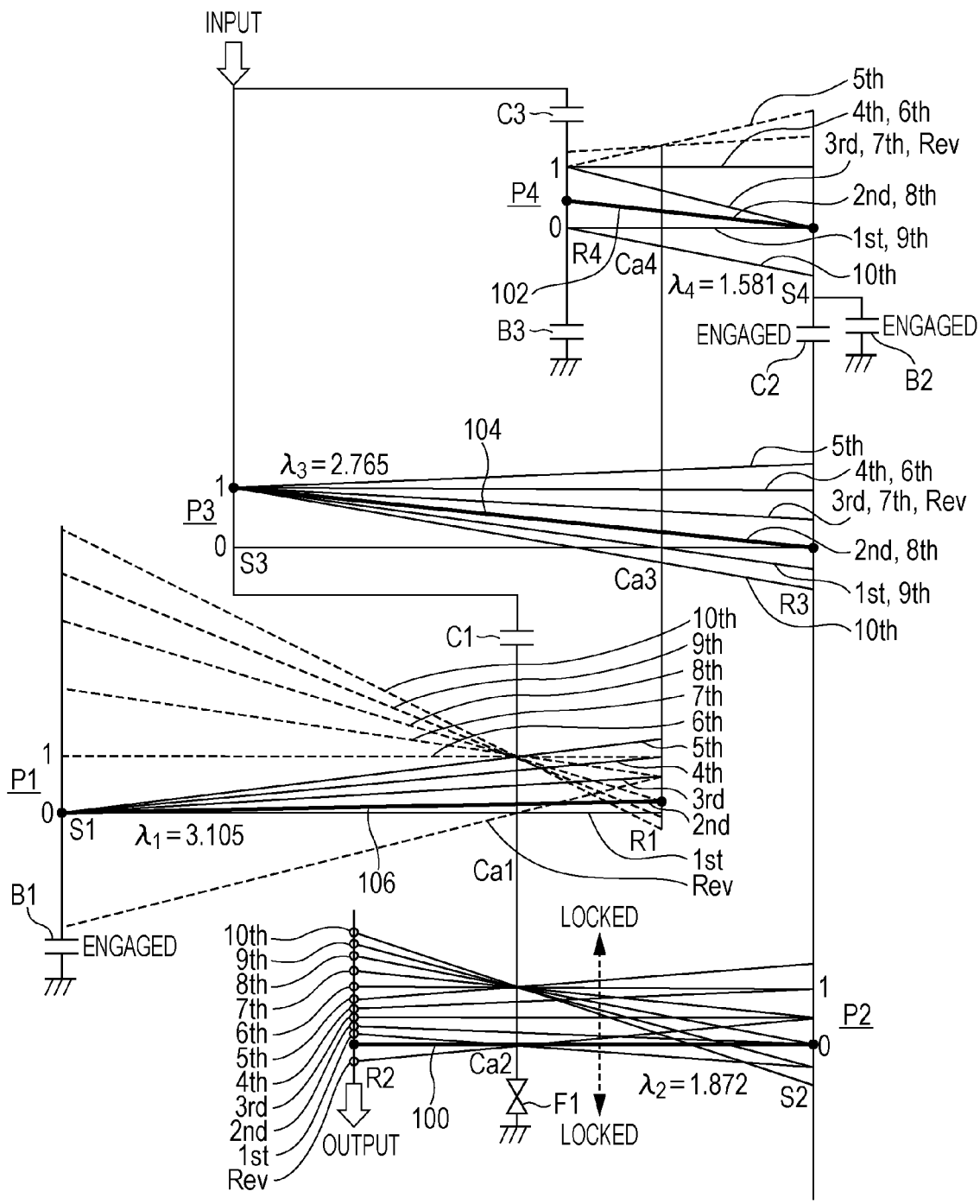
FIG. 8A illustrates, in the velocity diagrams in FIGS. 7A to 7C, a state in which the TWC is in reverse gear and locked for all gear ratios.
Figure 8B:
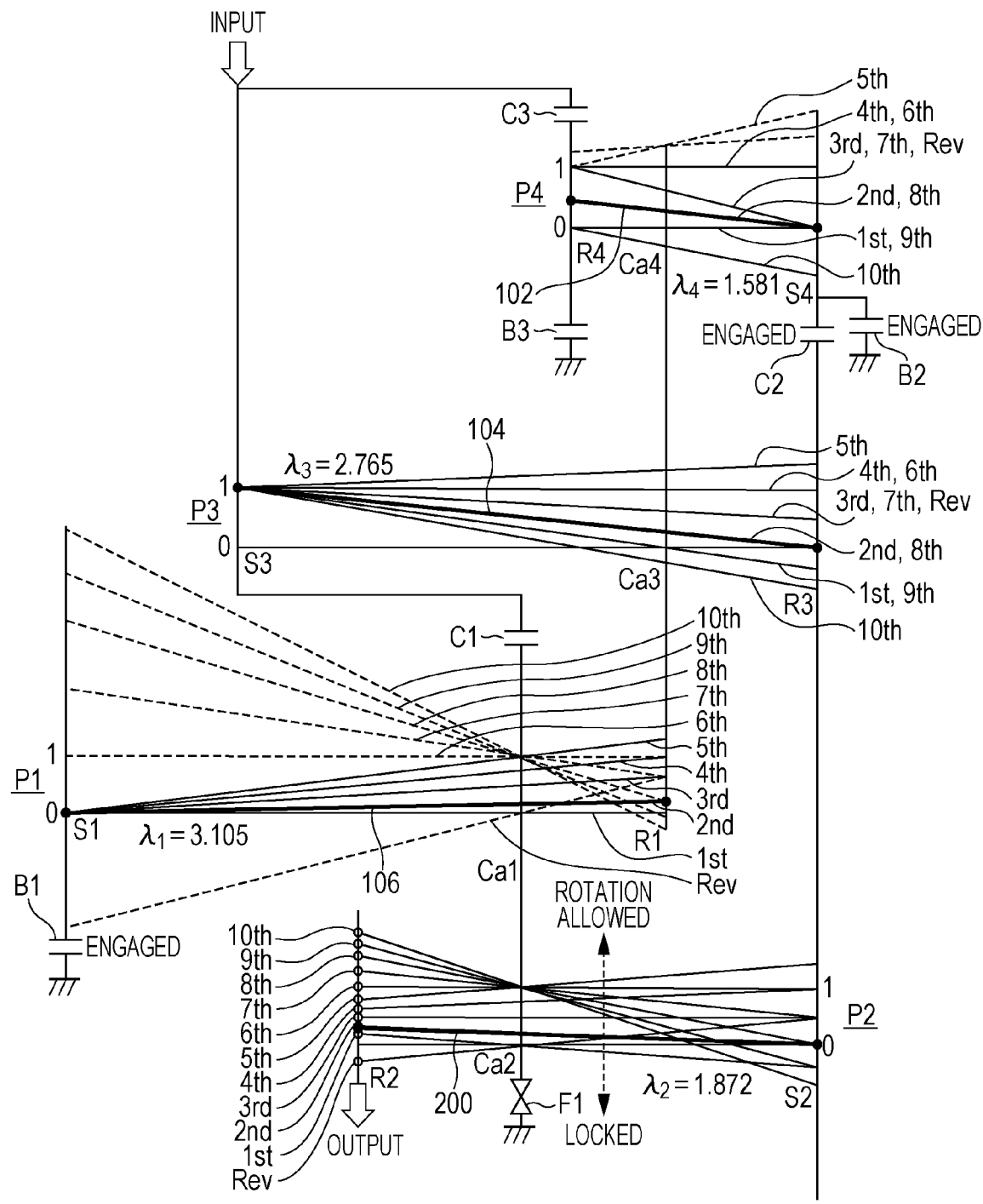
FIG. 8B illustrates, in the velocity diagrams in FIGS. 7A to 7C, a state in which the TWC is in forward gear, locked for first gear and reverse gear, and free for forward gears higher than first gear.

FIG. 8A illustrates a state in which the TWC (F1) is locked for all gears when the TWC (F1) is on the reverse (R) side regarding the velocity diagrams of FIG. 7A. FIG. 8B illustrates a state in which the TWC (F1) is locked for first gear and reverse gear and is free for second and higher forward gears when the TWC (F1) is on the forward (D) side regarding the velocity diagrams of FIGS. 7B and 7C.

In order to prevent backward movement of a vehicle during idling, an operation of engaging clutches/brakes is performed to lock the output shaft of the transmission. In the embodiment illustrated in FIG. 1A, the output shaft is locked by engaging the clutch C2 and the brake B2. In the following description in the present specification, a combination of engagements of clutches and brakes with which the output shaft is locked to prevent backward movement of the vehicle when the vehicle stops, that is, a combination of engagements for idling reduction control, will be referred to as "idling reduction engagement".

In the embodiment shown in FIG. 1A, clutches and brakes that are related to "idling reduction engagement" are the clutch C2 and the brake B2. In the control process according to the embodiment described below, in addition to control for preventing backward movement of a vehicle using the clutch C2 and the brake B2, additional control for preventing an engagement shock when finishing idling reduction control is performed by using the clutch C2 and the brake B2. The additional control is performed to prevent an engagement shock when the gear is changed from that when the vehicle is stopped to a D-range gear or a reverse gear and control of the transmission is changed from idling reduction control to normal control.

Figure 9A:
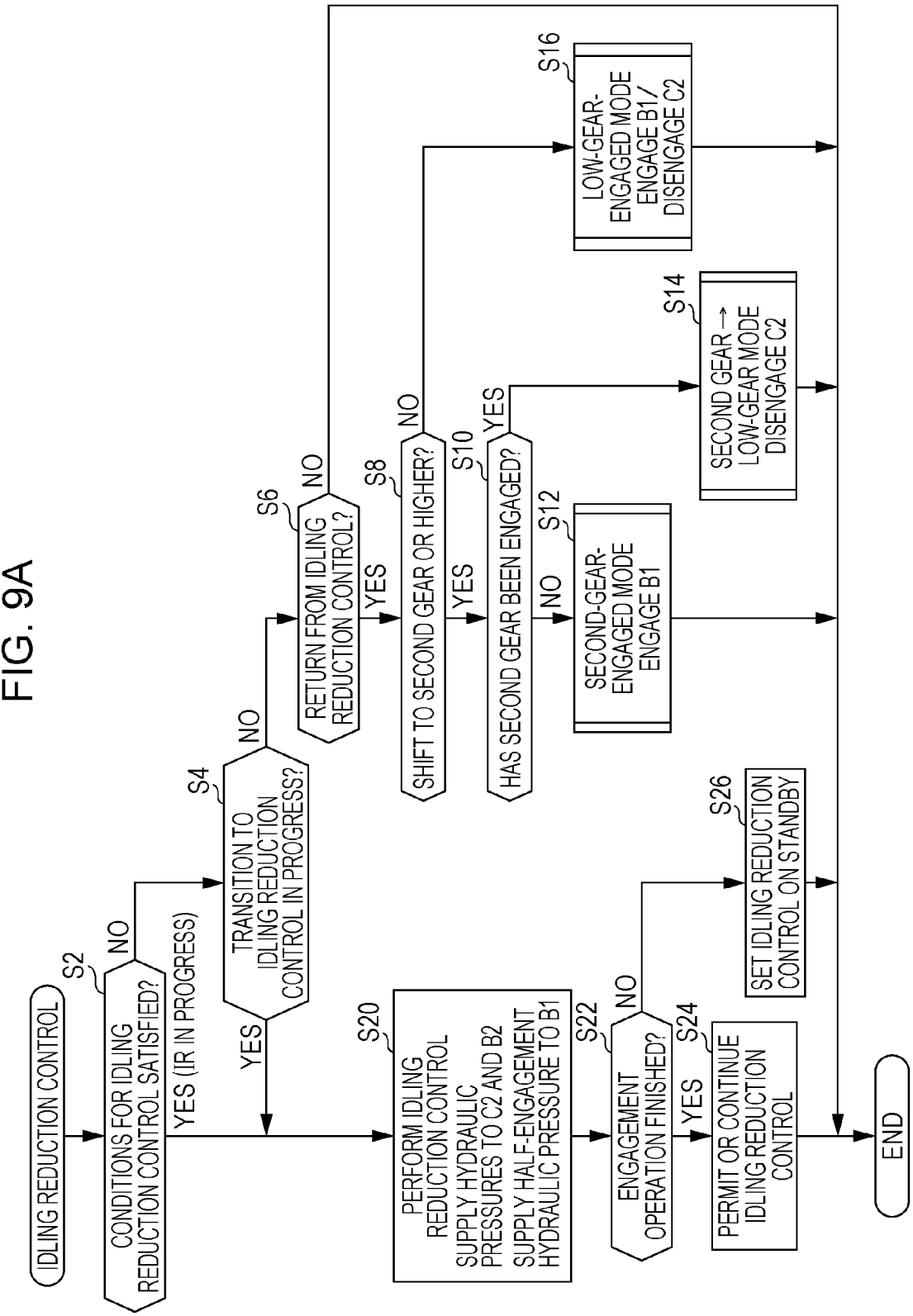
FIG. 9A is a flowchart illustrating a process of controlling the automatic transmission according to an embodiment that includes an electric pump, the process being performed when stopping idling reduction control.

FIG. 9A illustrates a control process according to the embodiment in which not only idling reduction control but also control for preventing "engagement shock" is performed.

In step S2 of FIG. 9A, whether or not conditions for idling reduction control are satisfied is checked. The conditions for idling reduction control are as follows: the brake pedal signal is ON (the brake pedal is depressed); the vehicle velocity is substantially zero; and the oil temperature is in a predetermined range. If these conditions are satisfied, the control proceeds to step S20, and idling reduction control is performed. Idling reduction control is performed by engaging the clutch C2 and the brake B2. When the clutch C2 and the brake B2 are engaged, the sun gear S4 of the planetary gear mechanism P4 is locked, and the sun gear S2 of the planetary gear mechanism P2, which is coupled to the clutch C2, is also locked. In step S22, whether or not the operation of engaging the clutch C2 and the brake B2 has been finished is checked. In this state, the automatic transmission according to the present embodiment is in an "idling reduction engagement" state.

When the clutch C2 and the brake B2 are engaged and the rotational speed of the sun gear S2 of the planetary gear mechanism P2 is zero, as shown in the velocity diagrams of FIGS. 7A to 7C, the rotational speeds of the carrier Ca2 and the ring gear R2 of the planetary gear mechanism P2 are zero. The output of the ring gear R2 of the planetary gear mechanism P2 is the axial output, and unintentional backward movement of the vehicle is prevented as the rotational speed of the ring gear R2 is maintained at zero.

Regarding illustration of this control, refer to a velocity line 100 of the planetary gear mechanism P2 in FIG. 8A.

Next, a case where the conditions for idling reduction control are not satisfied in the control process shown in FIG. 9A will be described. Such a case occurs, for example, if the driver releases the brake pedal.

In this case, the process proceeds from step S2 to step S4, and whether or not transition to idling reduction control is being performed is checked. A state in which transition to idling reduction control is being performed refers to a state in which the operation of engaging the clutch C2 and the brake B2 has not been finished. If it is detected that the operation of engaging the clutch C2 and the brake B2 has not been finished, the process returns from step S4 to step S20, and whether or not the operation of engaging the clutch and the brake has finished is checked. If the operation of engaging the clutch and the brake has been finished, the process proceeds from step S4 to step S6, and whether or not the control is "control for returning from idling reduction control" is checked by checking whether or not the TWC (F1) was on the D-side or on the R-side. As shown in the table of FIG. 3, the TWC (F1) is engaged only when the transmission is in reverse (R) gear or first gear, and is disengaged when the transmission is in second gear or higher. In other words, in the control process shown in FIG. 9A, when control of the transmission is changed from idling reduction control to normal control by changing the gear to second gear or higher, until the determination in step S8 becomes "YES" and it is determined in step S10 that a second-gear-engaged mode has been finished, control for entering the second-gear-engaged mode in step S12 is performed.

In other words, in step S8, whether or not the state of the automatic transmission according to the embodiment is to be changed from an "idling reduction engagement state" to a state in which second or higher gear is engaged (YES in step S8) or to a state in which a low gear (first gear or reverse gear) is engaged (NO in step S8). Shifting to second gear or higher is checked because the engagement shock is large when the gear is shifted to second gear or higher.

Prevention of Engagement Shock

A case where control of the transmission is changed from idling reduction control to normal control in second gear (or higher) will be considered.

In step S12, the brake B1 is engaged. When the brake B1 is engaged, the sun gear S1 of the planetary gear mechanism P1 is locked and the rotational speed of the sun gear S1 is zero, the rotational speed of the carrier Ca1 of the planetary gear mechanism P1 is zero, and the rotational speed the carrier Ca2 of the planetary gear mechanism P2 is zero. Therefore, the rotational speed of the main shaft (the ring gear R2 of the planetary gear mechanism P2) of the transmission is controlled to be low. Therefore, when the vehicle starts from the idling reduction control mode at second or higher gear, the second-gear-engaged mode of step S12 is performed to prevent engagement shock.

A case where control of the transmission is changed from idling reduction control to normal control in first gear will be described.

This is a case where determination in step S2 is "NO", determination in step S4 is NO, determination in step S6 is YES, and determination in step S8 is NO. In this case, in step S16, the brake B1 is engaged and the clutch C2 is disengaged.

Others

In step S20 of FIG. 9A, "the hydraulic pressure applied to B1 is set at a pressure with which B1 becomes half-engaged". By half-engaging the brake B1, the vehicle can move smoothly when control of the vehicle is changed from idling reduction control to normal control.

Advantages of the first embodiment will be described below.

Advantages of First Embodiment

Advantage 1

Existing idling reduction control methods address the problem of backward movement of a vehicle, which may occur when control of the vehicle returns from idling reduction control to normal control, by using an inclination angle sensor or by detecting a brake pressure. In contrast, the present embodiment prevents backward movement of a vehicle by engaging two engagement elements (C2 and B2) during idling reduction control so as to allow the input shaft to freely rotate while locking rotation of the output shaft in a reverse direction (or in both forward and reverse directions). Therefore, the present embodiment solves the above problem with the existing methods. That is, backward movement of a vehicle can be prevented without using a sensor.

Advantage 2

In particular, the present embodiment has an advantage obtained by using the TWC in "idling reduction engagement". Thus, when C2 and B2 are engaged (i.e. "idling reduction engagement"), when the TWC is on the D-side (as shown in FIGS. 7B and 7C), the output shaft is locked in the reverse direction and is free in the forward direction. As a result, backward movement of a vehicle due to an inclination can be easily prevented by using the function of the TWC.

Advantage 3

When C2 and B2 are engaged so as to be in "idling reduction engagement", if the TWC is on the R-side (FIG. 7A), the output shaft is locked. Therefore, backward movement of a vehicle due to an inclination can be avoided.

In the "idling reduction engagement" state, both the clutch C2 and the brake B2 are engaged. Therefore, change to first-gear-engaged state (in which B1 and B2 are engaged) can be set by switching between the engagement states of B1 and C2. As a result, the control structure according to the embodiment is simple.

Advantage 4

The control process according to the embodiment is configured to prevent engagement shock. Thus, the present embodiment not only has an advantage that unintentional backward movement of a vehicle can be prevented when stopping idling reduction control, but also has an advantage that engagement shock, in particular, engagement shock that occurs when shifting to a low gear can be prevented.

Advantage 5

Responsiveness at the time of starting the vehicle can be maintained by half-engaging the brake B1 during idling reduction control.

Advantage 6

In idling reduction control, "idling reduction engagement" is performed. Therefore, the state of the transmission is changed from the idling reduction engagement to first-gear-engaged state by switching between the engagement states of C2 and B1 while maintaining the brake B2 to be engaged (steps S12 and S16). At this time, the hydraulic pressure applied to C2 is maintained so that backward movement of a vehicle would not occur, and when the hydraulic pressure applied to B1 becomes a level at which backward movement does not occur, C2 is fully disengaged.

Advantage 7

When the TWC is on the D-side, the transmission is in "idling reduction engagement" state (in which both C2 and B2 are engaged). By further engaging the brake B1, second gear becomes engaged, and then the clutch C2 is disengaged to engage first gear. As a result, engagement shock is reduced.

Advantage 8

When the TWC is on the D-side, rotation in forward direction is free at the time of "idling reduction engagement". Therefore, idling reduction engagement can be set when the vehicle is moving at a low speed.

Second Embodiment

The first embodiment described above includes an electric pump, and hydraulic pressures applied to the clutches and the brakes can be controlled by using the electric pump even when the engine stops. The second embodiment includes an accumulator instead of the electric pump. The accumulator is a mechanical pressure storage device that stores hydraulic pressure in an accumulator tank when the engine is operating and maintains the pressure while idling reduction control is performed. When returning from idling reduction control, the pressure stored in the accumulator tank is used.

Referring to FIG. 9B, a control process according to the second embodiment will be described. Steps S30, S32, S42, and S44 correspond to checking whether or not the conditions for idling reduction control are satisfied. In other words, if control of the vehicle is not returning from idling reduction control, engine is not stopped, and the vehicle velocity is considerably low, control proceeds from step S44 to step S46. In step S46, the clutch C2 and the brake B2 are engaged, and the TWC is made free with respect to engine input.

As described above, when idling reduction control is fully performed, the engine is stopped. As a result, hydraulic pressures are not supplied to the clutches and the brakes and they only have residual pressures.

In the second embodiment, hydraulic pressure stored in the accumulator is used.

In other words, when returning from idling reduction control, in step S34, the clutch C2 and the brake B2 are engaged by applying all hydraulic pressure in the accumulator to the clutch C2 and the brake B2 by fully activating the linear solenoids. In step S36, hydraulic pressure from the accumulator is applied to the brake B1 to engage the brake B1.

In step S38, whether or not the operation of engaging the brake B1 has been finished is checked. In step S40, the clutch C2 is disengaged.

Thus, idling reduction control is finished.

Advantages of Second Embodiment

In the second embodiment described above, the accumulator is used when the engine stops, instead of the oil pump used in the first embodiment. Therefore, the second embodiment has advantages the same as those of the first embodiment, which are obtained by using "idling reduction engagement" and a combination of "idling reduction engagement" and the TWC. Hereinafter, a modification of the second embodiment will be described.

First Modification

When the vehicle speed is low before the vehicle stops in a D-range, idling reduction engagement (where C2 are B2 engaged) may be set early in order to fill an oil passage, which is used when returning from idling reduction control, with ATF (in order to reduce an ineffective stroke).

Advantage 1

Hydraulic pressure is not supplied when idling reduction control is being performed. When returning from idling reduction control, the clutch C2 and the brake B2 are immediately engaged by fully activating the linear solenoids for controlling the clutch C2 and the brake B2. Thus, backward movement of the vehicle can be reliably avoided. This is because, the hydraulic pressures applied to C2 and B2 have been stored by operating the oil pump while the engine is normally driven.

Second Modification

With the second embodiment, when returning from idling reduction control, upon receiving a signal determining return from idling reduction control, hydraulic pressure in the accumulator tank is supplied beforehand to the brake B1. This is performed for the purpose of obtaining an advantage of reduction in gear-engagement response time.

For the same purpose, when returning from idling reduction engagement, if the vehicle stops and the rotational speeds of all rotational elements in the transmission are substantially 0 rpm, the brake B1 may be engaged by fully activating linear solenoids for controlling the brake B1 to keep (maintain) the rotational speed of the main shaft to be 0 when returning from idling reduction engagement.

Advantage 2

In the second embodiment, as in the first embodiment, during idling reduction control, change from idling reduction engagement to first gear is performed by switching between the engagement states of C2 and B1 while maintaining the brake B2 to be engaged. At this time, the hydraulic pressure applied to C2 is maintained so that backward movement of a vehicle would not occur, and when the hydraulic pressure applied to B1 becomes a level at which backward movement does not occur, C2 is fully disengaged.

As a result, also with the second embodiment, when the TWC is on the D-side, by engaging the brake B1 in idling reduction engagement (in which C2 and B2 are engaged), second gear becomes engaged, and then the clutch C2 is disengaged to engage first gear. As a result, engagement shock is reduced.

According to an embodiment, an automatic transmission controller controls an automatic transmission that transmits a driving force from an internal combustion engine to a wheel of a vehicle while shifting the driving force by selecting a gear ratio from a plurality of gear ratios in accordance with a driving state of the vehicle. The automatic transmission includes a starting mechanism connected to the internal combustion engine; a plurality of planetary gear mechanisms each including rotation elements that are a sun gear, a carrier, and a ring gear; and a plurality of engagement mechanisms that connect or hold fixed the rotation elements of the planetary gear mechanisms and that set the plurality of gear ratios of the automatic transmission by means of a combination of engagements between the plurality of engagement mechanisms and the rotation elements, one of the plurality of engagement mechanisms being a mechanical engagement mechanism that permits switching of a rotational direction of one of the rotation elements of the plurality of planetary gear mechanisms. The automatic transmission controller includes an idling reduction controller that performs idling reduction control in which the mechanical engagement mechanism is operated to switch rotational directions for a forward gear and a reverse gear and to allow rotation in each of the forward gear and the reverse gear and in which the internal combustion engine is stopped; an idling-reduction-control permission determiner that determines whether or not to permit the idling reduction control; and an engagement controller that, when the idling-reduction-control permission determiner permits the idling reduction control, allows rotation of an input shaft of the automatic transmission, and that in a case where an output shaft of the automatic transmission is rotated by a wheel of the vehicle in a rotational direction such that the vehicle moves backward, sets the plurality of engagement mechanisms including at least the mechanical engagement mechanism so as to fix the output shaft of the automatic transmission to a casing of the automatic transmission or so as to prevent the vehicle from moving backward.

In the automatic transmission controller, the engagement mechanisms commonly involved in combinations of engagements of the engagement mechanisms for setting a lowest forward gear and the reverse gear may include the mechanical engagement mechanism; a first brake that fixes a rotation element of a second planetary gear mechanism that is different from a first planetary gear mechanism including a rotation element that is held fixed by the mechanical engagement mechanism; and a first clutch that connects a rotation element of the second planetary gear mechanism that is held fixed by the first brake, a rotation element of the first planetary mechanism held fixed by the mechanical engagement mechanism, and a rotation element that is not connected to the output shaft of the automatic transmission.

With the embodiment, movement of a vehicle during idling reduction control is restricted by using a combination of engagement of the automatic transmission with which the input shaft is set free and the output shaft is fixed. Therefore, it is not necessary to provide the vehicle with a special device for restricting movement, and reductions in the manufacturing cost, the weight, and the fuel cost can be achieved.

In addition to the embodiment described above, the present disclosure describes embodiments having the following advantages.

For example, with some of the embodiments, when changing from idling reduction control to normal control in forward or reverse gear, it is only necessary to change the engagement states of an engagement mechanism that sets the input shaft to be free and fixes the output shaft and a remaining one of a combination of engagements that form the lowest forward gear and reverse gear. Therefore, controllability is high.

With one of the embodiments, high engagement response when shifting from reverse gear to forward gear can be obtained.

With one of the embodiments, when shifting from reverse gear to first gear, the transmission is temporarily shifted to a gear (second gear) higher than first gear and then shifting is performed. Therefore, the embodiment has a special advantage in that engagement shock can be reduced.

With one of the embodiments, even when the vehicle does not have an electric pump, oil passages connected to frictional clutches or brakes that engage when control returns from idling reduction control are filled with hydraulic oil. Therefore, response when control returns from idling reduction control can be improved.

With one of the embodiments, even when the vehicle does not have an electric pump, response when control returns from idling reduction control can be improved.

With one of the embodiments, even when the vehicle does not have an electric pump, response when control returns from idling reduction control can be improved.

With one of the embodiments, movement of the vehicle, in particular, backward movement of the vehicle when control returns from idling reduction control can be prevented.

With one of the embodiments, when shifting from reverse gear to first gear, the transmission is temporarily shifted to a gear (second gear) higher than first gear and then shifting is performed. Therefore, the embodiment has a special advantage in that engagement shock can be reduced.

With one of the embodiments, the fuel efficiency is improved because idling reduction control can be started quickly.

Obviously, numerous modifications and variations of the present invention are possible in light of the above teachings. It is therefore to be understood that within the scope of the appended claims, the invention may be practiced otherwise than as specifically described herein.

What is claimed is:

1. An automatic transmission controller for controlling an automatic transmission that transmits a driving force from an internal combustion engine to a wheel of a vehicle while shifting the driving force by selecting a gear ratio from a plurality of gear ratios in accordance with a driving state of the vehicle, the automatic transmission including
- a starting mechanism connected to the internal combustion engine,
- a plurality of planetary gear mechanisms each including rotation elements that are a sun gear, a carrier, and a ring gear, and
- a plurality of engagement mechanisms that connect or hold fixed the rotation elements of the planetary gear mechanisms and that set the plurality of gear ratios of the automatic transmission by means of a combination of engagements between the plurality of engagement mechanisms and the rotation elements, one of the plurality of engagement mechanisms being a mechanical engagement mechanism that permits switching of a rotational direction of one of the rotation elements of the plurality of planetary gear mechanisms, the automatic transmission controller comprising:
- an idling reduction controller that performs idling reduction control in which the mechanical engagement mechanism is operated to switch rotational directions for a forward gear and a reverse gear and to allow rotation in each of the forward gear and the reverse gear and in which the internal combustion engine is stopped;
- an idling-reduction-control permission determiner that determines whether or not to permit the idling reduction control; and
- an engagement controller that, when the idling-reduction-control permission determiner permits the idling reduction control, allows rotation of an input shaft of the automatic transmission, and that, in a case where an output shaft of the automatic transmission is rotated by a wheel of the vehicle in a rotational direction such that the vehicle moves backward, sets the plurality of engagement mechanisms including at least the mechanical engagement mechanism so as to fix the output shaft of the automatic transmission to a casing of the automatic transmission or so as to prevent the vehicle from moving backward.

2. The automatic transmission controller according to claim 1,
wherein the engagement mechanisms commonly involved in combinations of engagements of the engagement mechanisms for setting a lowest forward gear and the reverse gear include
the mechanical engagement mechanism,
a first brake that fixes a rotation element of a second planetary gear mechanism that is different from a first planetary gear mechanism including a rotation element that is held fixed by the mechanical engagement mechanism, and
a first clutch that connects a rotation element of the second planetary gear mechanism that is held fixed by the first brake, a rotation element of the first planetary mechanism held fixed by the mechanical engagement mechanism, and a rotation element that is not connected to the output shaft of the automatic transmission.

3. The automatic transmission controller according to claim 2, further comprising:
a first hydraulic pump that is driven by a driving force of the internal combustion engine and a second hydraulic pump that is driven by an electric motor,
wherein the engagement controller causes one of the engagement mechanisms that is involved in the combination of engagements for setting the lowest forward gear and that is not engaged in the idling reduction control to be engaged while the idling reduction control is performed by supplying a hydraulic pressure from the second hydraulic pump and maintains the hydraulic pressure from the second hydraulic pump at a level at which the engagement mechanism does not generate an engagement force.

4. The automatic transmission controller according to claim 3,
wherein a combination of the mechanical engagement mechanism, the first brake, the first clutch, and one of the engagement mechanisms that is included in the combination of engagement mechanisms for setting the lowest forward gear and that is not engaged during the idling reduction control is a combination of engagement mechanisms for setting a predetermined forward gear that is higher than the lowest forward gear, the combination of the mechanical engagement mechanism, the first brake, and the first clutch being a combination of engagement mechanisms that are engaged during the idling reduction control, and
wherein the combination is changed to the combination of engagements that sets the lowest forward gear after setting the predetermined forward gear.

5. An automatic transmission controller for controlling an automatic transmission that transmits a driving force from an internal combustion engine to a wheel of a vehicle while shifting the driving force by selecting a gear ratio from a plurality of gear ratios in accordance with a driving state of the vehicle,
the automatic transmission including
a starting mechanism connected to the internal combustion engine,
a plurality of planetary gear mechanisms each including rotation elements that are a sun gear, a carrier, and a ring gear,
a plurality of engagement mechanisms that connect or hold fixed the rotation elements of the planetary gear mechanisms and that set the plurality of gear ratios of the automatic transmission by means of a combination of engagements between the plurality of engagement mechanisms and the rotation elements, one of the plurality of engagement mechanisms being a mechanical engagement mechanism that permits switching of a rotational direction of one of the rotation elements of the plurality of planetary gear mechanisms, the other engagement mechanisms being frictional engagement mechanisms that are operated by using a hydraulic pressure, and
a first hydraulic pump that generates a hydraulic pressure when the internal combustion engine is driven,
the automatic transmission controller comprising:
an idling reduction controller that performs idling reduction control in which the mechanical engagement mechanism is operated to switch rotational directions for a forward gear and a reverse gear and to allow rotation in each of the forward gear and the reverse gear and in which the internal combustion engine is stopped;
a vehicle velocity detector that detects a velocity of the vehicle; and
an engagement controller that, when the detected velocity of the vehicle is less than or equal to a predetermined value, allows rotation of an input shaft of the automatic transmission, and that, in a case where an output shaft of the automatic transmission is rotated by a wheel of the vehicle in a rotational direction such that the vehicle moves backward, sets the plurality of engagement mechanisms including at least the mechanical engagement mechanism so as to fix the output shaft of the automatic transmission to a casing of the automatic transmission.

6. The automatic transmission controller according to claim 5,
wherein the engagement mechanisms commonly involved in combinations of engagements of the engagement mechanisms for setting a lowest forward gear and the reverse gear include
the mechanical engagement mechanism,
a first brake that fixes a rotation element of a second planetary gear mechanism that is different from a first planetary gear mechanism including a rotation element that is held fixed by the mechanical engagement mechanism, and
a first clutch that connects a rotation element of the second planetary gear mechanism that is held fixed by the first brake, a rotation element of the first planetary mechanism that is held fixed by the mechanical engagement mechanism, and a rotation element that is not connected to the output shaft of the automatic transmission.

7. The automatic transmission controller according to claim 6,
wherein, when control of the vehicle returns from the idling reduction control, valves for supplying hydraulic pressures to the frictional engagement mechanisms that are included in a combination of engagements that includes the mechanical engagement mechanism and with which the output shaft of the automatic transmission is fixed to the casing are quickly opened.

8. The automatic transmission controller according to claim 6, further comprising:
an accumulator for storing a hydraulic pressure,
wherein the accumulator supplies the hydraulic pressure to one of the engagement mechanisms that is included in a combination of engagements that sets the lowest forward gear when control of the vehicle returns from the idling reduction control and that is not engaged during the idling reduction control.

9. The automatic transmission controller according to claim 6,
wherein, when control of the vehicle returns from the idling reduction control, if a vehicle velocity detected by the vehicle velocity detector is substantially zero, a rotational speed of the input shaft is zero, and a rotational speed of the output shaft is zero, a valve connected to one of the engagement mechanisms that forms the lowest gear and that is not engaged during the idling reduction control is fully opened to supply a hydraulic pressure to the engagement mechanism.

10. The automatic transmission controller according to claim 6,
wherein a combination of the engagement mechanisms that are engaged when control returns from the idling reduction control and the engagement mechanism that forms the lowest forward gear and that is not engaged when control returns from the idling reduction control is a combination of engagement mechanisms for setting a predetermined forward gear that is higher than the lowest forward gear, and
wherein the combination is changed to the combination of engagements that sets the lowest forward gear after setting the predetermined forward gear.

11. The automatic transmission controller according to claim 1,
wherein, in a case where the idling reduction control is performed when the vehicle is moving in a forward direction at a predetermined velocity or lower, a rotational direction of the mechanical engagement mechanism is switched to a direction that allows movement of the vehicle in the forward direction.

12. The automatic transmission controller according to claim 5,
wherein, in a case where the idling reduction control is performed when the vehicle is moving in a forward direction at a predetermined velocity or lower, a rotational direction of the mechanical engagement mechanism is switched to a direction that allows movement of the vehicle in the forward direction.

13. An automatic transmission controller for controlling an automatic transmission that transmits a driving force from an internal combustion engine to a wheel of a vehicle while shifting the driving force by selecting a gear ratio from a plurality of gear ratios in accordance with a driving state of the vehicle, the automatic transmission including
a starting mechanism connected to the internal combustion engine;
a plurality of planetary gear mechanisms each including rotation elements including a sun gear, a carrier, and a ring gear; and
a plurality of engagement mechanisms that connect or hold fixed the rotation elements of the planetary gear mechanisms and that set the plurality of gear ratios of the automatic transmission by means of a combination of engagements between the plurality of engagement mechanisms and the rotation elements, one of the plurality of engagement mechanisms being a mechanical engagement mechanism that permits switching of a rotational direction of one of the rotation elements of the plurality of planetary gear mechanisms, the automatic transmission controller comprising:

an idling reduction controller configured to perform idling reduction control in which the mechanical engagement mechanism is operated to switch rotational directions for a forward gear and a reverse gear and to allow rotation in each of the forward gear and the reverse gear and in which the internal combustion engine is stopped;

an idling-reduction-control permission determiner configured to determine whether or not to permit the idling reduction control; and an engagement controller, in a case where the idling-reduction-control permission determiner permits the idling reduction control, configured to allow rotation of an input shaft of the automatic transmission, and in a case where an output shaft of the automatic transmission is rotated by a wheel of the vehicle in a rotational direction such that the vehicle moves backward, configured to set the plurality of engagement mechanisms including at least the mechanical engagement mechanism so as to fix the output shaft of the automatic transmission to a casing of the automatic transmission or so as to prevent the vehicle from moving backward.

14. The automatic transmission controller according to claim 13, wherein engagement mechanisms commonly involved in combinations of engagements of the plurality of engagement mechanisms for setting a lowest forward gear and the reverse gear include the mechanical engagement mechanism, a first brake that fixes a rotation element of a second planetary gear mechanism that is different from a first planetary gear mechanism including a rotation element that is held fixed by the mechanical engagement mechanism, and a first clutch that connects a rotation element of the second planetary gear mechanism that is held fixed by the first brake, a rotation element of the first planetary mechanism held fixed by the mechanical engagement mechanism, and a rotation element that is not connected to the output shaft of the automatic transmission.

15. The automatic transmission controller according to claim 14, further comprising:

a first hydraulic pump that is driven by a driving force of the internal combustion engine and a second hydraulic pump that is driven by an electric motor, wherein the engagement controller causes one of the plurality of engagement mechanisms that is involved in a combination of engagements for setting the lowest forward gear and that is not engaged in the idling reduction control to be engaged while the idling reduction control is performed by supplying a hydraulic pressure from the second hydraulic pump and maintains the hydraulic pressure from the second hydraulic pump at a level at which the engagement mechanism does not generate an engagement force.

16. The automatic transmission controller according to claim 15, wherein a combination of the mechanical engagement mechanism, the first brake, the first clutch, and one of the plurality of engagement mechanisms that is included in a combination of engagement mechanisms for setting the lowest forward gear and that is not engaged during the idling reduction control is a combination of engagement mechanisms for setting a predetermined forward gear that is higher than the lowest forward gear, a combination of the mechanical engagement mechanism, the first brake, and the first clutch being a combination of engagement mechanisms that are engaged during the idling reduction control, and wherein the combination is changed to a combination of engagements that sets the lowest forward gear after setting the predetermined forward gear.

17. An automatic transmission controller for controlling an automatic transmission that transmits a driving force from an internal combustion engine to a wheel of a vehicle while shifting the driving force by selecting a gear ratio from a plurality of gear ratios in accordance with a driving state of the vehicle, the automatic transmission including a starting mechanism connected to the internal combustion engine;

a plurality of planetary gear mechanisms each including rotation elements including a sun gear, a carrier, and a ring gear;

a plurality of engagement mechanisms that connect or hold fixed the rotation elements of the planetary gear mechanisms and that set the plurality of gear ratios of the automatic transmission by means of a combination of engagements between the plurality of engagement mechanisms and the rotation elements, one of the plurality of engagement mechanisms being a mechanical engagement mechanism that permits switching of a rotational direction of one of the rotation elements of the plurality of planetary gear mechanisms, other engagement mechanisms being frictional engagement mechanisms that are operated by using a hydraulic pressure; and a first hydraulic pump that generates a hydraulic pressure when the internal combustion engine is driven, the automatic transmission controller comprising:

an idling reduction controller configured to perform idling reduction control in which the mechanical engagement mechanism is operated to switch rotational directions for a forward gear and a reverse gear and to allow rotation in each of the forward gear and the reverse gear and in which the internal combustion engine is stopped;

a vehicle velocity detector configured to detect a velocity of the vehicle; and an engagement controller, in a case where the detected velocity of the vehicle is less than or equal to a predetermined value, configured to allow rotation of an input shaft of the automatic transmission, and in a case where an output shaft of the automatic transmission is rotated by a wheel of the vehicle in a rotational direction such that the vehicle moves backward, configured to set the plurality of engagement mechanisms including at least the mechanical engagement mechanism so as to fix the output shaft of the automatic transmission to a casing of the automatic transmission.

18. The automatic transmission controller according to claim 17, wherein engagement mechanisms commonly involved in combinations of engagements of the plurality of engagement mechanisms for setting a lowest forward gear and the reverse gear include the mechanical engagement mechanism,
a first brake that fixes a rotation element of a second planetary gear mechanism that is different from a first planetary gear mechanism including a rotation element that is held fixed by the mechanical engagement mechanism, and
a first clutch that connects a rotation element of the second planetary gear mechanism that is held fixed by the first brake, a rotation element of the first planetary mechanism that is held fixed by the mechanical engagement mechanism, and a rotation element that is not connected to the output shaft of the automatic transmission.

19. The automatic transmission controller according to claim 18,
wherein, when control of the vehicle returns from the idling reduction control, valves for supplying hydraulic pressures to the frictional engagement mechanisms that are included in a combination of engagements that includes the mechanical engagement mechanism and with which the output shaft of the automatic transmission is fixed to the casing are quickly opened.

20. The automatic transmission controller according to claim 18, further comprising:
an accumulator for storing a hydraulic pressure,
wherein the accumulator supplies the hydraulic pressure to one of the plurality of engagement mechanisms that is included in a combination of engagements that sets the lowest forward gear when control of the vehicle returns from the idling reduction control and that is not engaged during the idling reduction control.

21. The automatic transmission controller according to claim 18,
wherein, when control of the vehicle returns from the idling reduction control, if a vehicle velocity detected by the vehicle velocity detector is substantially zero, a rotational speed of the input shaft is zero, and a rotational speed of the output shaft is zero, a valve connected to one of the plurality of engagement mechanisms that provides the lowest forward gear and that is not engaged during the idling reduction control is fully opened to supply a hydraulic pressure to the engagement mechanism.

22. The automatic transmission controller according to claim 18,
wherein a combination of the engagement mechanisms that are engaged when control returns from the idling reduction control and the engagement mechanism that provides the lowest forward gear and that is not engaged when control returns from the idling reduction control is a combination of engagement mechanisms for setting a predetermined forward gear that is higher than the lowest forward gear, and
wherein the combination is changed to a combination of engagements that sets the lowest forward gear after setting the predetermined forward gear.

23. The automatic transmission controller according to claim 13,
wherein, in a case where the idling reduction control is performed when the vehicle is moving in a forward direction at a predetermined velocity or lower, a rotational direction of the mechanical engagement mechanism is switched to a direction that allows movement of the vehicle in the forward direction.

24. The automatic transmission controller according to claim 17,
wherein, in a case where the idling reduction control is performed when the vehicle is moving in a forward direction at a predetermined velocity or lower, a rotational direction of the mechanical engagement mechanism is switched to a direction that allows movement of the vehicle in the forward direction.

\* \* \* \* \*